US009130766B2

(12) United States Patent
Phuah et al.

(10) Patent No.: US 9,130,766 B2
(45) Date of Patent: Sep. 8, 2015

(54) SYSTEM FOR AND METHOD OF PERFORMING RESIDENTIAL GATEWAY DIAGNOSTICS AND CORRECTIVE ACTIONS

(75) Inventors: Vincent Phuah, Waltham, MA (US); Lujun Jia, Foxborough, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 791 days.

(21) Appl. No.: 12/640,101

(22) Filed: Dec. 17, 2009

(65) Prior Publication Data

US 2011/0149720 A1    Jun. 23, 2011

(51) Int. Cl.
*H04L 12/26* (2006.01)
*H04L 12/24* (2006.01)

(52) U.S. Cl.
CPC ........ *H04L 12/2697* (2013.01); *H04L 41/0681* (2013.01); *H04L 43/0811* (2013.01); *H04L 43/0817* (2013.01); *H04L 43/50* (2013.01)

(58) Field of Classification Search
CPC .. H04L 12/2697; H04L 43/50; H04L 43/0811
See application file for complete search history.

(56) References Cited

U.S. PATENT DOCUMENTS

| | | | |
|---|---|---|---|
| 5,124,908 A * | 6/1992 | Broadbent | 700/83 |
| 6,853,680 B1 * | 2/2005 | Nikolich | 375/222 |
| 7,281,040 B1 * | 10/2007 | Ly | 709/224 |
| 2002/0122050 A1 * | 9/2002 | Sandberg | 345/705 |
| 2002/0136165 A1 * | 9/2002 | Ady et al. | 370/241 |
| 2004/0218613 A1 * | 11/2004 | Fortman | 370/401 |
| 2006/0126706 A1 * | 6/2006 | Brand et al. | 375/222 |
| 2007/0047449 A1 * | 3/2007 | Berger et al. | 370/241 |
| 2009/0100492 A1 * | 4/2009 | Hicks et al. | 725/127 |
| 2009/0245115 A1 * | 10/2009 | Krishnaswamy et al. | 370/242 |

* cited by examiner

*Primary Examiner* — Jason Mattis

(57) ABSTRACT

A system for and method of system for performing residential gateway diagnostics and corrective actions is presented. In one exemplary embodiment, the method may comprise running one or more diagnostic tests on a residential gateway using a module of the residential gateway, storing a diagnostic test result, analyzing the diagnostic test result, and performing one or more corrective actions in response to the diagnostic test result.

19 Claims, 9 Drawing Sheets

SYSTEM FOR AND METHOD OF PERFORMING RESIDENTIAL GATEWAY DIAGNOSTICS AND CORRECTIVE ACTIONS

BACKGROUND INFORMATION

Residential gateway devices support a number of interfaces and devices. Configuration, maintenance, and diagnostics of residential gateway devices is too complex for many users. The inability of users to configure and troubleshoot residential gateway devices results in an increase of requests for technical support. The inability of users to configure and troubleshoot residential gateway devices also results in the return of a number of correctly operating residential gateway devices.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Residential gateways, broadband home routers, Customer Premise Equipment, and other remotely located network access devices provide an increasing level of services and interfaces. The increasing number of services and interfaces enhance the complexity for setup and maintenance. According to an exemplary embodiment, a residential gateway, a broadband router, or other network access device may include one or more of: a module, an agent, or a process for performing one or more diagnostic tests. The module, process, or agent may be configured to analyze data from the diagnostic test and perform one or more corrective actions in response to the analysis. The state of the network access device may be captured and saved in persistent storage for further analysis. The administration of the agent in terms of activation, configuration, execution, and retrieval of test results may be performed via a network access device management system. For certain network access device error conditions, an end user of the device may be prompted with a supporting help user interface (e.g., web pages provided or served by the network access device) to assist in troubleshooting and fixing the error conditions.

Figure 1:
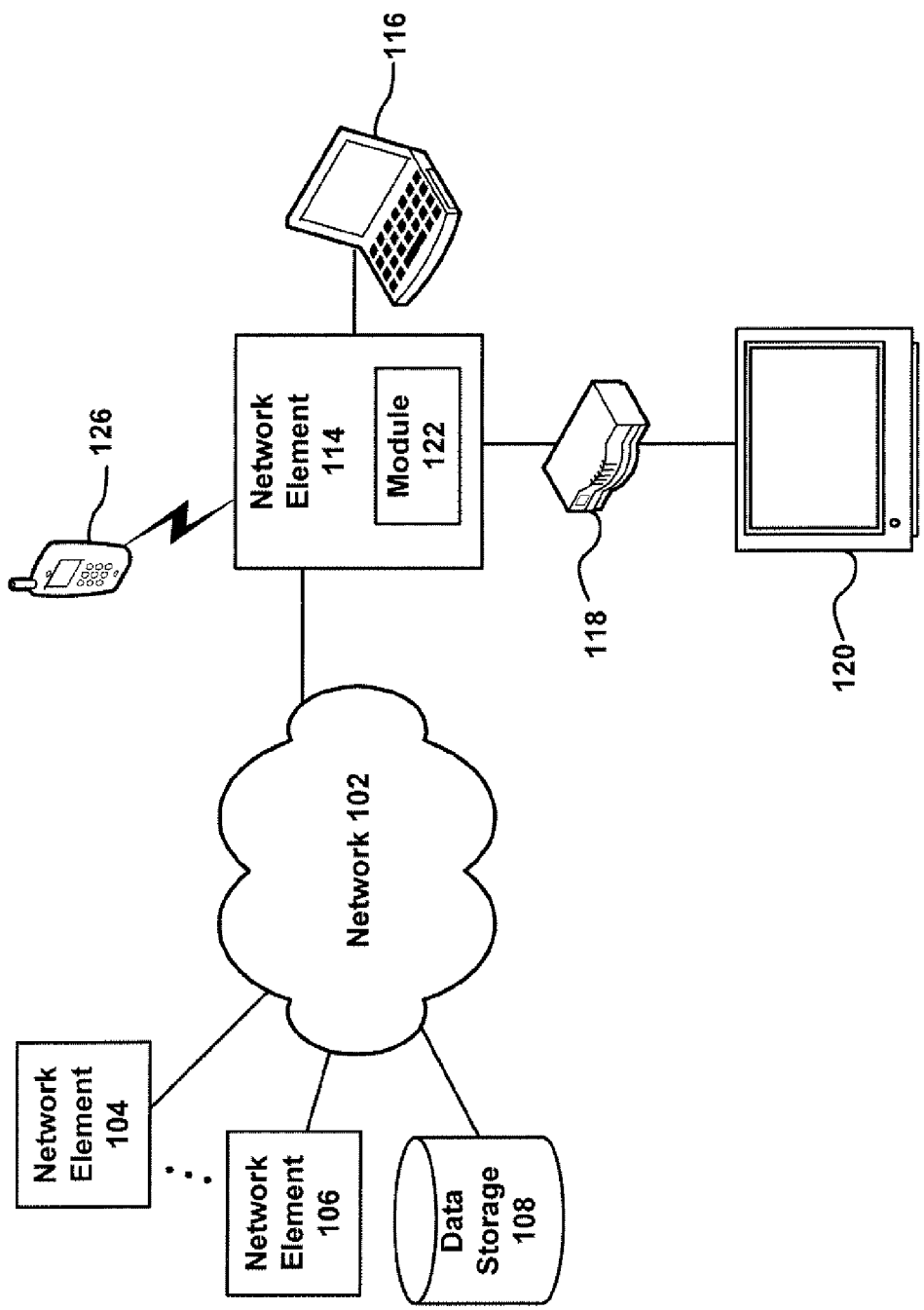
FIG. 1 is a schematic diagram illustrating a system for performing residential gateway diagnostics and corrective actions, according to a particular embodiment.

FIG. 1 is a schematic diagram illustrating a system for performing residential gateway diagnostics and corrective actions, according to a particular embodiment. As illustrated, network 102 may be communicatively coupled with one or more devices including network element 104, network element 106, data storage 108, and network element 114. Network element 114 may contain module 122. Other devices may be communicatively coupled with network 102 via one or more intermediary devices. Set-top box 118 may be communicatively coupled with network 102 via network element 114. Wireless device 126, network client 116, and set-top box 118 may communicate with network 102 via network element 114. Television set 120 may be communicatively coupled to set-top box 118.

The description below describes network elements, computers, and/or components of a system of and method for performing residential gateway diagnostics and corrective actions that may include one or more modules. As used herein, the term "module" may be understood to refer to computing software, firmware, hardware, and/or various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 102 may include, without limitation, telephone line, fiber optics, IEEE Ethernet 802.3, a Wide Area Network ("WAN"), a Local Area Network ("LAN"), or a global network such as the Internet. Also, network 102 may support, an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, and home networks.

Network elements 104, 106, 114, and data storage 108 may transmit and receive data to and from network 102 representing residential gateway diagnostic data, error correction data, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VoIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b and 802.11g. Network 102 may also use protocols for a wired connection, such as an WEE Ethernet 802.3.

Wireless device 126 may be a wireline phone, a cellular phone, a mobile phone, a satellite phone, a Personal Digital Assistants (PDA), a computer, a handheld MP3 player, a handheld video player, a personal media player, a gaming device, or other devices capable of communicating with network 102 via network element 114. According to some embodiments, wireless device 126 may be use Voice Over IP ("VOIP") to provide one or more services.

Network client 116 may be a desktop computer, a laptop computer, a server, a personal digital assistant, or other computer capable of sending and receiving network signals. Network client 116 may use a wired or wireless connection. Although depicted as connected via a residential gateway in FIG. 1, in one or more embodiments, network client 116 may connect directly to network 102 or via other network connectivity devices. According to one or more embodiments, network client 116 using a wireless connection may authenticate with a network using Wired Equivalent Privacy, Wi-Fi Protected Access or other wireless network security standards.

Network elements 104 and 106, data storage 108, and network element 114 may include one or more processors (not shown) for recording, transmitting, receiving, and storing data. Although network elements and data storage 108 are depicted as individual elements, it should be appreciated that the contents of one or more of a network element and data storage 108 may be combined into fewer or greater numbers of devices and may be connected to additional devices not depicted in FIG. 1. Furthermore, the one or more devices may be local, remote, or a combination thereof to a first network element and data storage 108.

Data storage 108 may be network accessible storage and may be local, remote, or a combination thereof to network elements 104 and 106. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

According to some embodiments, data storage 108 may be a relational database that may store diagnostic data, configuration data, and data associated with corrective actions. Data may be aggregated, sorted, processed, and queried to identify memory trends, network connectivity problems, configuration problems, and other issues. Associations may be made between identified issues identified in the diagnostic data and appropriate corrective actions. According to some embodiments, data storage 108 may provide one or more APIs or other interfaces which may be used by a web server or other application to distribute, present, and share information.

Network elements 104 and 106 may be one or more servers (or server-like devices), such as a Session Initiation Protocol ("SIP") server. Network elements 104 and 106 may include one or more processors (not shown) for recording, transmitting, receiving, and storing data. According to one or more embodiments, network elements 104 and 106 may contain SNMP (Simple Network Management Protocol) Managers and other network management tools. Network elements 104 and 106 may be servers of a service provider, the Internet, a broadcaster, a cable television network, or another media provider. According to some embodiments network element 104 may be a Domain Name Server (DNS), a gateway, or other network infrastructure.

According to some embodiments, Network element 106 may be a broadband home router management system, a Customer Premise Equipment (CPE) management system, or a residential gateway management system. Network element 106 may receive or query diagnostic test results and other data from residential gateways, broadband home routers, and other Customer Premise Equipment (CPE). Network element 106 may store diagnostic test results locally or remotely such as on data storage 108. Network element 106 may administer an agent, process, or module on a residential gateway, a broadband home router, or other Customer Premise Equipment (CPE). For example, network element 106 may activate module 122, configure module 122, or initiate the execution of one or more diagnostic test results or corrective actions by module 122. Network element 106 may contain or access configuration information for configuring residential gateways and other network access devices. For example, network element 106 may receive data from module 122 indicating that network element 114 has accessed network 102. Network element 106 may configure network element 114. Configuration may include configuring module 122 to run one or more diagnostic tests on a periodic schedule. Configuration may also include providing network element 114 with data associating one or more corrective actions with one or more diagnostic test results. Module 122 may be capable of running diagnostic tests and performing corrective actions independently of network element 106 and independent of a status of network connectivity for network element 114. According to some embodiments, network element 114 may be provided to a customer pre-configured.

Network elements 104 and 106 may provide Application Programming Interfaces ("APIs"), interface tables, Remote Procedure Calls ("RPCs"), web services, Extensible Markup Language ("XML") based interfaces, Simple Object Access Protocol ("SOAP") based interfaces, Common Object Request Broker Architecture ("CORBA") and other interfaces for sending or receiving media searches, preferences or other information. Network elements 104 and 106 may receive data from broadcasters, users, service providers, internet information sources, or other media related information sources.

According to one or more embodiments, network element 114 may be a residential gateway, such as a router, or another piece of Customer Premises Equipment ("CPE") providing access to one or more pieces of equipment. For example, network element 114 may provide audio/video programming content feeds to a set-top box, such as set-top box 120. Network element 114 may also provide network connectivity for other clients such as network client 116 and wireless device 126. One or more additional devices may be present. For example, network element 114 may be connected to network 102 via an Optical Network Terminal (ONT). A gateway may also be present which may provide or deny network element 114 access to network 102.

According to some embodiments, module 122 may perform one or more diagnostic tests, may store diagnostic test results, analyze one or more diagnostic test results, and may perform one or more corrective actions in response to a diagnostic test result. Module 122 may include an agent or a process for performing diagnostic test results or corrective actions. According to some embodiments, module 122 may be executable software stored on electronic storage of network element 114 and executed by one or more processors of network element 114. Tests and corrective actions performed by module 122 may be performed in response to a request, such as a request from an equipment management system. Module 122 may also perform tests and corrective actions as a periodic scheduled event. According to some embodiments, if a measured parameter on network element 114 meets a specified criteria, one or more diagnostic tests or corrective actions may be performed. For example, one or more diagnostic tests may be performed or scheduled if a CPU, memory, or other component of network element 114 exceeds a specified threshold.

Diagnostic tests performed by module 122 may include internal system resource tests, WAN tests, LAN tests, and other tests. Internal system resource tests may include, but are not limited to, a memory utilization test, a CPU utilization test, and a software version test. LAN diagnostic tests performed by module 122 may include, for example, a test to verify that a LAN interface is enabled and active, a test to verify that bandwidth for a Multimedia over Coax Alliance (MoCA) based interface meets a specified threshold, a test to verify that errors of a LAN Ethernet port are below a specified threshold (e.g., CRC (Cyclic Redundancy Check) errors, framing errors, hardware port failures), a test to verify that a WiFi signal level meets a specified threshold, a test to determine a number of connected and active LAN devices, a test to determine whether a connected LAN device has an IP address assigned, a test to determine the bandwidth of a LAN interface, and a test to verify IP connectivity of a Multimedia over Coax Alliance (MoCA) based set-top box device. WAN diagnostic tests performed by module 122 may include, but are not limited to, a test to ensure that a connected residential gateway has a single WAN interface active; a test to verify that a WAN interface transmission rate meets a specified threshold, a test to verify that errors of a WAN Ethernet port are below a specified threshold, a WAN IP assignment test, a WAN IP connectivity test, and a WAN interface bandwidth test.

Module 122 may store one or more diagnostic test results. Diagnostic test results may be stored locally on electronic storage of network element 114, or remote from network element 114 such as in data storage 108. Diagnostic test results may be stored in one or more formats including, but not limited to, a log file and as a Technical Report 069 compliant parameter extension ("TR-069" is a Customer Premise Equipment WAN management protocol published by the Broadband Forum in technical report *TR-069 CPE WAN Management Protocol v.* 1.1, Issue 1, Amendment 2, (December 2007) and incorporated herein by reference in its entirety). Module 122 may transmit diagnostic test results or provide an interface to diagnostic test results. For example, module 122 may transmit diagnostic test results to network element 106 or be queried by network element 106. According to some embodiments, module 122 may transmit diagnostic test data using TR-069 to network element 106.

Corrective actions performed by module 122 may include resetting a network interface of network access equipment such as a residential gateway or broadband home router. Corrective actions performed by module 122 may also include rebooting a residential gateway, and resetting one or more parameters of the residential gateway to a default setting (e.g., a factory setting). Corrective actions to execute may be identified based on stored data associating a corrective action with a diagnostic test result. According to one or more embodiments, corrective actions for a particular test result may be prioritized indicating a first corrective action to try and one or more subsequent corrective actions to try if a fault or error persists. For example, the number of reboots of a piece of network access equipment may be counted. After a specified number of reboots (e.g., three) parameters of the network access equipment may be reset if the fault or error persists.

According to some embodiments, corrective actions may comprise providing a user interface to a user of the network access equipment. For example, a user interface may be a web page served by module 122 to wireless device 126 or network client 116. The user interface may provide results of a diagnostic test, such as an error code, an error description, suggested corrective actions, pictures of network equipment identifying features or aspects of the equipment, screenshots showing configuration information, and support group contact information. For example, a broadband home router may be depicted and connections, interfaces, tags, controls, and other aspects of the router may be identified. Descriptive text may be included in the user interface explaining configuration and use of the depicted broadband home router. In some embodiments, a user interface may include a web page provided via public wireless access (e.g., not using WEP (Wired Equivalent Privacy)). The public wireless access may be limited to configuration instructions, troubleshooting instructions, support contact information, and diagnostic information which does not provide any confidential, proprietary, or sensitive information. The public wireless access may be disabled automatically after success resolution of a setup or configuration issue. The public wireless access may provide information on how to connect a wired connection to network element 114 (e.g., a diagram may show an Ethernet port or other port of network element 114 and provide instructions on how to configure a laptop to connect to network element 114). More detailed instructions may be provided via a non-public wired connection. The user interface may be generated by module 122 regardless of whether network element 114 has network connectivity. Thus, a user may be able to receive support prior to establishing connectivity for network element 114.

The various components of system 100 as shown in FIG. 1 may be further duplicated, combined and/or integrated to support various applications and platforms. Additional elements may also be implemented in the systems described above to support various applications.

Figure 2:
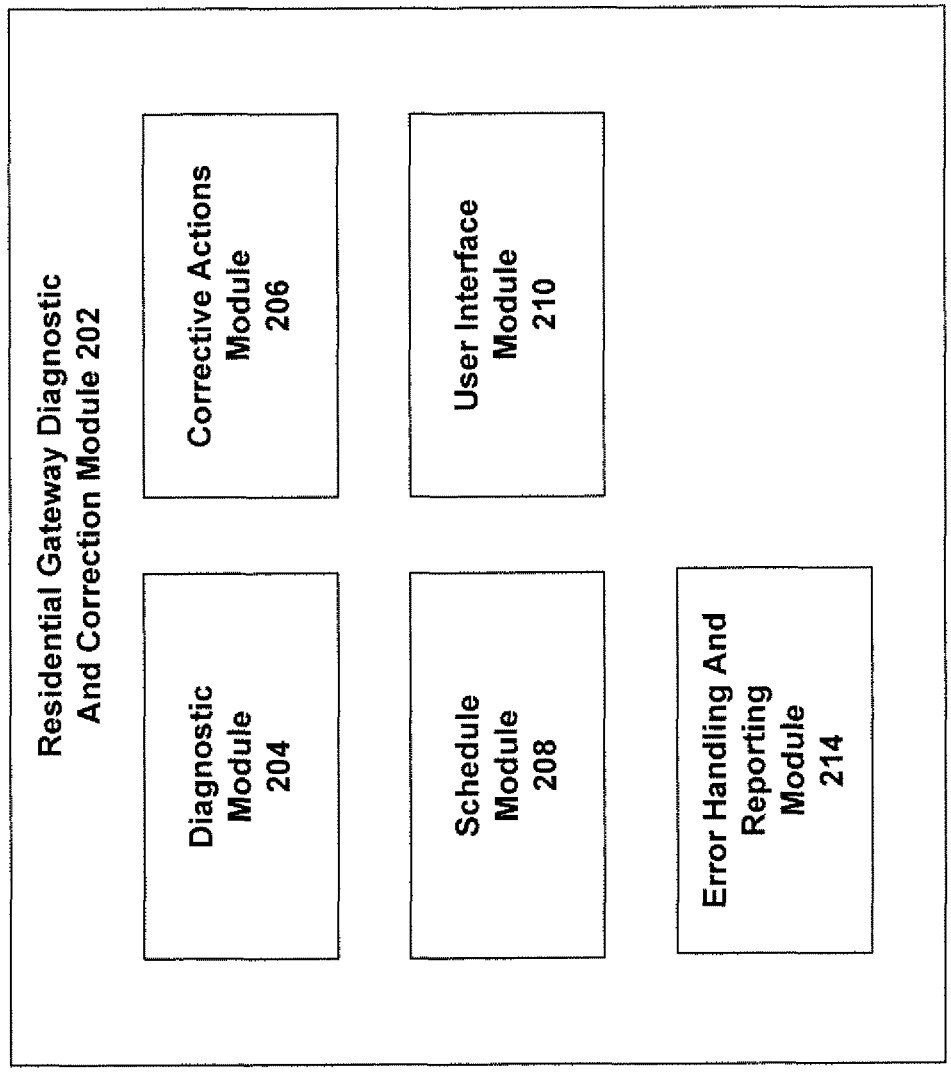
FIG. 2 is a block diagram of a hardware component of the system for performing residential gateway diagnostics and corrective actions, according to a particular embodiment.

FIG. 2 is a block diagram of a hardware component of the system for performing residential gateway diagnostics and corrective actions according to a particular embodiment. As illustrated, the residential gateway diagnostic and correction module 202 may contain one or more components including diagnostic module 204, corrective actions module 206, schedule module 208, user interface module 210, and error handling/reporting module 214. Although residential gateway diagnostic and correction module 202 is depicted as a single module, functionality or modules of residential gateway diagnostic and correction module 202 may be located on a single device or distributed across a plurality of devices including one or more centralized servers and one or more pieces of customer premises equipment or end user devices.

Diagnostic module 204 may run one or more diagnostic tests, may store diagnostic test results, and analyze one or more diagnostic test results. Diagnostic tests performed by diagnostic module 204 may include internal system resource tests, WAN tests, LAN tests, and other tests. Internal system resource tests may include, but are not limited to, a memory utilization test, a CPU utilization test, and a software version test. LAN diagnostic tests performed by diagnostic module 204 may include, for example, a test to verify that a LAN interface is enabled and active, a test to verify that bandwidth for a Multimedia over Coax Alliance (MoCA) based interface meets a specified threshold, a test to verify that errors of a LAN Ethernet port are below a specified threshold (e.g., CRC (Cyclic Redundancy Check) errors, framing errors, hardware port failures), a test to verify that a WiFi signal level meets a specified threshold, a test to determine a number of connected and active LAN devices, a test to determine whether a connected LAN device has an IP address assigned, a test to determine the bandwidth of a LAN interface, and a test to verify IP connectivity of a Multimedia over Coax Alliance (MoCA) based set-top box device. WAN diagnostic tests performed by diagnostic module 204 may include, but are not limited to, a test to ensure that a connected residential gateway has a single WAN interface active; a test to verify that a WAN interface transmission rate meets a specified threshold, a test to verify that errors of a WAN Ethernet port are below a specified threshold, a WAN IP assignment test, a WAN IP connectivity test, and a WAN interface bandwidth test.

Corrective actions module 206 may perform one or more corrective actions. Corrective actions may be performed in response to a received command, in response to a diagnostic test result, or as a scheduled event. Corrective actions performed by corrective actions module 206 may include resetting a network interface of network access equipment such as a residential gateway or broadband home router. Corrective actions performed by corrective actions module 206 may also include rebooting a residential gateway, and resetting one or more parameters of the residential gateway to a default setting (e.g., a factory setting). Corrective actions to execute may be identified based on stored data associating a corrective action with a diagnostic test result. According to one or more embodiments, corrective actions for a particular test result may be prioritized indicating a first corrective action to try and one or more subsequent corrective actions to try if a fault or error persists. For example, the number of reboots of a piece of network access equipment may be counted. After a specified number of reboots (e.g., three) parameters of the network access equipment may be reset if the fault or error persists.

Schedule module 208 may schedule one or more diagnostic tests, corrective actions, or other events. Upon the arrival of a scheduled time, schedule module 208 may initiate execution of a diagnostic test or corrective action via communication with diagnostic module 204 or corrective actions module 206 respectively.

User interface module 210 may provide a user interface to a user of the network access equipment. For example, a user interface may be a web page served by user interface module 210 to wireless device 126 or network client 116. The user interface may provide results of a diagnostic test, such as an error code, an error description, suggested corrective actions, pictures of network equipment identifying features or aspects of the equipment, screenshots showing configuration information, and support group contact information. For example, a broadband home router may be depicted and connections, interfaces, tags, controls, and other aspects of the router may be identified. Descriptive text may be included in the user interface explaining configuration and use of the depicted broadband home router. In some embodiments, a user interface may include a web page provided via public wireless access (e.g., not WEP enabled). The public wireless access may be limited to configuration instructions, troubleshooting instructions, support contact information, and diagnostic information which does not provide any confidential, proprietary, or sensitive information. The public wireless access may be disabled automatically after success resolution of a setup or configuration issue. The public wireless access may provide information on how to connect a wired connection to network element 114 (e.g., a diagram may show an Ethernet port or other port of network element 114 and provide instructions on how to configure a laptop to connect to network element 114). More detailed instructions may be provided via a non-public wired connection. The user interface may be generated by user interface module 210 regardless of whether network element 114 has network connectivity. Thus, a user may be able to receive support prior to establishing connectivity for network element 114.

Error handling and reporting module 214 may handle one or more errors associated with diagnostic tests or corrective actions. Error handling and reporting module 214 may provide alerts or messages to administrators in the event of an error. Error handling and reporting module 214 may produce one or more reports including diagnostic test result reports and corrective action reports. Error handling and reporting module 214 may produce log files, TR-069 formatted reports, and reports in other formats.

Figure 3:
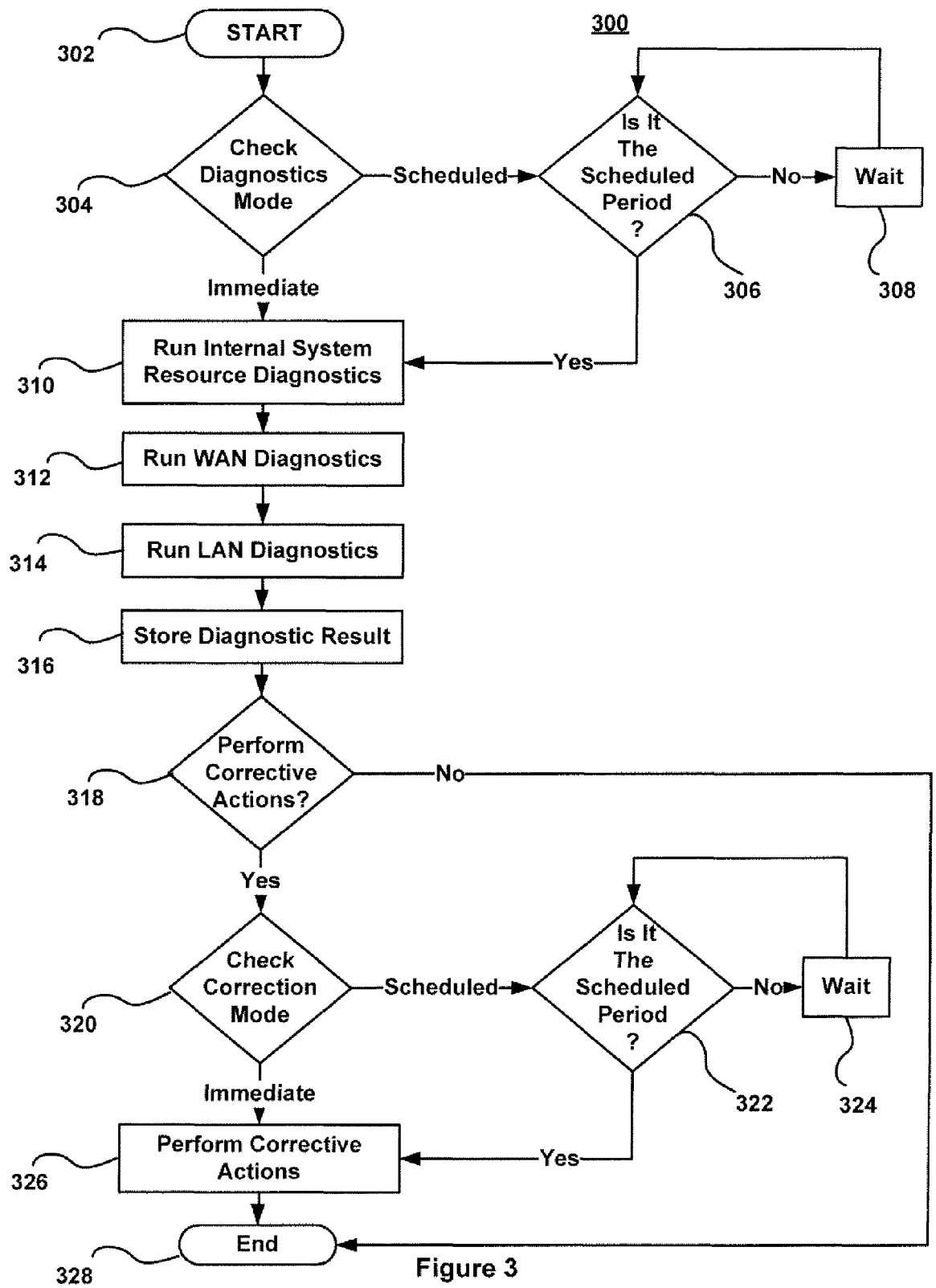
FIG. 3 illustrates the appearance of a user interface of a system for performing residential gateway diagnostics and corrective actions, according to a particular embodiment.

FIG. 3 illustrates the appearance of a user interface of a system for performing residential gateway diagnostics and corrective actions according to a particular embodiment.

The diagnostic tests of FIG. 3 specify an exemplary logging format for results. Upper case words may represent labels while lower case words may be variables representing assigned values. Threshold labels (e.g., MEM_THRESHOLD) may be values defined in a configuration file or as a TR-069 parameter extensions. For interface tests, the associated test may be performed if the interface is enabled; otherwise the test may be skipped and the returned result may be treated as TRUE. For an interface which is enabled, but in a disconnected state, the returned result may be treated as TRUE as well.

At block 302, the method 300 for residential gateway diagnostics may begin.

At block 304, the diagnostics mode may be verified. Diagnostics modes may include periodic and immediate execution of diagnostic tests. If a diagnostic test is scheduled, the method 300 may continue at block 306. If a request for an immediate diagnostic test has been received, the method 300 may continue at block 310.

At block 306, a process, agent, or module, such as module 122 may determine whether the scheduled period has arrived. If the scheduled period has arrived the method 300 may continue at block 310. If the scheduled period has not arrived the method 300 may wait at block 308. After a specified wait, the method 300 may return to block 306.

At block 310, one or more diagnostics tests may be performed. The number and type of diagnostics tests may be configurable. The configuration of diagnostic tests may occur prior to providing equipment, such as network element 114, to a user. Diagnostic tests may also be configured or scheduled remotely by a network access device management system, such as, network element 106. At block 310, one or more internal diagnostic tests may be performed to verify resources of a network access device such as, by way of non-limiting example, memory utilization, CPU utilization, electronic storage utilization, network interface status, software version, and firmware version. Thresholds of diagnostic tests may be defined using labels which may be specified as TR-069 parameters. As described below, labels, or threshold levels may be specified as uppercase terms. Actual values may be lower case terms.

According to some embodiments, an internal systems resource test may ensure that there are sufficient internal resources in order for a network access device, such as a broadband home router, to operate optimally. The internal systems resource test may be labeled with a TR-069 parameter of "TBHR." A CPU and memory utilization snapshot may be taken at the time during the self-diagnostics operation or using a polling interval. The polling interval may be specified with a label of "BANDWIDTH_POLLING_INTERVAL" as defined in greater detail below. The memory threshold test for a network access device may a condition labeled "CBHR_MEM." The memory threshold for a network access device may be tested using a label of "MEM_THRESHOLD" which may be configurable. An exemplary test for a memory threshold may be:

If the memory utilization <MEM_THRESHOLD then return TRUE else return FALSE

Internal systems resource tests may also test the CPU utilization which may be a condition labeled "CBHR_CPU." An exemplary test for the CPU utilization may be:

If CPU utilization <CPU_THRESHOLD then return TRUE else return FALSE

The internal systems resource test labeled "TBHR" may also capture other device statistics including: "pc" (a count of a total number of active processes); "mu" (a total percentage of memory utilized); "fu" (a total percentage of flash storage utilized); "cpu" (a total percentage of CPU utilized); "nat" (a total percentage of a NAT (Network Address Translation) table in use); "x" (an integer value indicating a status of one or more LEDs of a network access device (where 0=off, 1=on, and 2=flashing LED state, if applicable)); a listing of processes with corresponding memory utilization in decreasing order or in another order, (e.g., p1=mu1, p2=mu2; according to one embodiment only the top 5 processes will be listed); and a listing of processes with corresponding CPU utilization in decreasing order or in another order, (e.g., pp1=cpu1, pp2=cpu2; according to one embodiment only the top 5 processes will be listed). According to some embodiments, output from the an internal systems resource test may be written to a log, displayed, or stored as:

TBHR=cpu,mu,fu,pc,nat,WMOCALED=x,
WETHLED=x,LANMOCALED=x,
LANETHLED=x,LANWIFILED=x,
p1=mu, p2=mu2, . . . .
pp1=cpu, pp2=cpu2, . . . .

WMOCALED may indicate a status of an LED associated with a WAN MOCA interface. LANMOCALED may indicate a status of an LED associated with a LAN MOCA interface. LANETHLED may indicate a status of an LED associated with a LAN Ethernet interface. After internal systems resource tests are completed, the method 300 may continue at block 312.

At block 312, one or more WAN interface tests may be performed. A first WAN interface test may verify that only one WAN interface is enabled and active at a time when a device is in a connected state. This WAN Interface Type test may be labeled "TWANTYPE." The condition tested may be labeled "CWANTYPE." The "CWANTYPE" condition test may be:

If and only if one WAN interface is enabled return TRUE else return FALSE

OR

If both interfaces are enabled but disconnected then return TRUE.

The output from the diagnostic test may be:

TWANTYPE=ETH=tr,MOCA=tr

The "tr" may be a variable for True or False, where True=enabled and False=disabled. "ETH" may be an abbreviation for an WAN Ethernet interface and "MOCA" may be an abbreviation for a WAN MOCA interface.

Another WAN interface test performed at block 312 may include a WAN MoCA Interface test which may be labeled "TWANMOCA." This test may be performed if the MoCA interface is enabled. It may ensure that the transmission rate for both Tx (transmission rate) and Rx (reception rate) is greater than a MoCA threshold level for expected performance. A first condition tested may be for a WAN MOCA port status and the condition may be labeled "CWANMOCA_PORT." The test may be:

If the physical port is operational (no hardware failure) then TRUE else FALSE.

A second condition may test the transmission and reception rate and may be labeled "CWANMOCA_RATE." The test may be:

If both transmission rate (Tx and Rx) are greater than MoCA_THRESHOLD then return TRUE else return FALSE.

The "tr" may be a variable for True or False where True=good, False=bad. The "xx" may represent an integer value for a number of bytes or other unit of data transmission measurement. According to some embodiments, output from the test may be written to a log, displayed, or stored as:

TWANMOCA=PORT=tr,MOCATX=xx,MOCARX=xx

Another WAN test run at block 312 may include a WAN Ethernet Interface test which may be labeled "TWANETH." This test may verify that a WAN Ethernet port is operating optimally, i.e., no hardware issue, excessive framing errors, CRC (Cyclic Redundancy Check) errors, or other issues. This test may be run if a WAN Ethernet interface is enabled. A first condition tested may be labeled "CWANETH_PORT." The test may be:

If Ethernet port is operational (no hardware failure) then TRUE else FALSE

According to some embodiments, output from the test may be written to a log, displayed, or stored as:

TWANETH=PORT=tr.

The "tr" may be a variable holding "xx" and "yy" variables. The "xx" variable may be True or False where True=port enabled, False=port disabled. The "yy" may True or False where True=device attached and False=no device attached.

Still another WAN interface test performed at block 312 may be a WAN IP Assignment test which may be labeled "TWANIP." This test may ensures that a network access device has a WAN IP assigned. A first condition tested may be labeled "CWANIP." The test may be:

If WAN IP address is assigned then TRUE else FALSE

According to some embodiments, output from the test may be written to a log, displayed, or stored as:

TWANIP=IP=XXX.XXX.XXX.XXX

"XXX.XXX.XXX.XXX" may be a variable containing an IP address.

Other WAN interface tests run at block 312 may include a WAN IP Connectivity test which may be labeled "TWANIP-CON." This test may ensure that a network access device has WAN IP connectivity. The IP connectivity may be validated via ping tests to both a default gateway (the first hop network router) and a DNS (Domain Name Server). Several conditions may be tested. A first condition may test a default gateway and may be labeled "CWANIPCON_PNGDF." The test may be:

If default gateway responds to ICMP PING then TRUE else FALSE

A second condition of WAN IP connectivity which is tested may be labeled "CWANIPCON_PNGDNS." The test may be:

If DNS server responds to ICMP PING then TRUE else FALSE

A third condition of WAN IP connectivity which is tested may be labeled "CWANIPCON_DNSR." The test may be If DNS resolution is successful then TRUE else FALSE According to some embodiments, output from the test may be written to a log, displayed, or stored as:

TWANIPCON=DGIP=xxx.xxx.xxx.xxx, rt, DNSIP=xxx.xxx.xxx.xxx,rt,dnsr

"DGIP" may be a variable for a default gateway IP. "xxx.xxx.xxx.xxx" may be an IP address. "DNSIP" may be a variable for the IP address of a DNS. The variable "rt" may be an average ping response time in milliseconds. If a ping times out, then rt may equal −1. The variable "dnsr" may equal "T" or "F" where T equals "DNS resolution passed" and "F" equals "DNS resolution failed."

Still another WAN interface test performed at step 312 may test WAN Bandwidth Statistics and may be labeled "TWANBW." This test may ensure that the WAN interface is able to send and receive network traffic based on the delta bytes count. The delta bytes count may be the difference between the current value and the last recorded polled value. The poll interval may be configurable and may be set remotely by a network access device management system. A default value may be every hour. The delta bytes test condition may be labeled "CWANBW." The test may be:

If both the delta number of bytes sent and number of bytes received are greater then WANBW_THRESHOLD return TRUE else return FALSE According to some embodiments, output from the test may be written to a log, displayed, or stored as:

TWANBW=TB=xx,RB=xx

The label "TB" may signify transmission bandwidth. The label "RB" may signify reception bandwidth. The variables "xx" may hold an integer value representing a number of bytes.

In some embodiments, no WAN testing may be performed. In other embodiments, one or more WAN tests may be performed. After completion of WAN testing, the method 300 may begin LAN testing at block 314. A first test may be a LAN interface types test which may be labeled "TLAN-TYPE." This test may ensure that at least one of the LAN interfaces is enabled and active. A condition associated with this test may be labeled "CLANTYPE." The test may be:

If one or more of the LAN interface are enabled (i.e., LAN MoCA, LAN Ethernet, and LAN WiFi) then TRUE else FALSE.

According to some embodiments, output from the test may be written to a log, displayed, or stored as:

TLANTYPE=LMOCA=xx,LETH=xx,LWIFI=xx

The label "LMOCA" may be an abbreviation for a LAN MOCA interface. The label "LETH" may an abbreviation for a LAN Ethernet interface. The label "LWIFI" may be an abbreviation for a LAN WiFi interface. The variables "xx" may hold a "T" or "F" (where T=true; F=false).

A second LAN interface test which may be performed at step 314 may be a LAN MoCA Interface test which may be labeled "TLANMOCA." This test may be performed if the MoCA interface is enabled and active. It may ensure that the transmission rate for transmitted data (Tx) and received data (Rx) meets a specified criteria such as by way of non-limiting example 180 Mbps. A first condition of this test may check a LAN MOCA port and may be labeled "CLANMOCA_PORT." The test may be:

If the physical port is operational (no hardware failure) then TRUE else FALSE

A second condition of this test may check a LAN MOCA data rate and may be labeled "CLANMOCA_RATE." The test may be:

If both transmission rate (Tx and Rx) are greater than MoCA_THRESHOLD then return TRUE else return FALSE

OR

If Tx=0 and Rx=0 and MoCA LED is OFF then return TRUE

According to some embodiments, output from the test may be written to a log, displayed, or stored as:

TLANMOCA=PORT=tr,TX=xx,RX=xx

The variable "tr" may="T" or "F" where "T"=good and "F"=bad. The variables "xx" may hold an integer value representing a number of bytes.

A third LAN interface test which may be performed at step 314 may be a LAN Ethernet interface test and may be labeled "TLANETH." This test may be performed if the LAN Ethernet interface is enabled. It may ensure that one or more the Ethernet ports with devices attached are operating optimally, e.g., have no hardware port failures, excessive framing or CRC errors. A condition of this test may be labeled "CLANETH_PORT." The test may be:

If all the LAN Ethernet ports with attached device(s) are operating optimally (no hardware failure, etc.) then return TRUE else return FALSE The variable "tr" may equal "xx, yy" where "xx" may equal ("T"=port enabled or "F"=port disabled), and "yy" may equal ("T"=device attached or "F"=no device connected to the port). According to some embodiments, output from the test may be written to a log, displayed, or stored as:

TLANETH=PORT1=tr,PORT2=tr,PORT3=tr,PORT4=tr

Yet another LAN interface test which may be performed at step 314 may be a LAN WiFi Interface which may be labeled as "TLANWIFI." This test may ensure that a WiFi signal level (RSSI) is acceptable for one or more WiFi device that is visible in an interface. The test may only be performed if a Wifi interface is enabled. A condition of the test may be labeled "CLANWIFI_PORT." The test may be If the WiFi interface is operating optimally, (i.e., not hardware issues or errors) then return TRUE else return FALSE.

According to some embodiments, output from the test may be written to a log, displayed, or stored as:

TLANWIFI=PORT=tr,dc,ma1=r,ma2=r, . . . .

The variable "tr" may="T" or "F" where "T"=good and "F"=bad. The variable "dc" may hold an integer value representing a total device count. The variable "r" may hold an value representing a percentage of a RSSI (Received Signal Strength Indication) level of an attached WiFi device where 100% may imply a maximum signal. The variable "ma1" may hold an value representing a MAC (Media Access Control) Address for a first device (ma1). Other MAC address variables may be present for second and subsequent devices (e.g., "ma2").

Another LAN interface test which may be performed at step 314 may be a LAN Device Visibility test which may be labeled "TLANDEV." This test may determine how many LAN devices are currently attached and active on the various LAN interfaces (e.g., LAN Ethernet, LAN MoCA, and LAN WiFi) of a network access device. The device count determination may be done at the physical medium level and not at the IP level. A LAN device may be included in the count if it has been attached and active for more than a specified configurable period of time (e.g., 30 minutes). The specified period of time may be correlated to a frequency of record updates on a network access device. A first condition of this test may be labeled "CLANDEV." The test may be:

If one or more LAN devices are attached and active then return TRUE else return FALSE According to some embodiments, output from the test may be written to a log, displayed, or stored as:

TLANDEV=DMOCA=xx,DETH=xx,DWIFI=xx

The label "TLANDEV" may signify the total LAN device count. The label "DMOCA" may signify the count of devices attached via a LAN MOCA interface. The label "DETH" may signify a count of devices attached via a LAN Ethernet interface. The label "DWIFI" may signify a count of devices attached via a WiFI interface. The variables "xx" may hold an integer value representing a number of devices associated with that interface.

Still another LAN interface test which may be performed at step 314 may be a LAN Device IP Address Assignment test which may be labeled "TLANIP." This test may ensure that one or more LAN devices that are currently attached and active have an IP address assigned correctly. One of the method to determine if the LAN device is active or inactive may be sending an ARP request from a network access device, such as network element 114. A condition of the test may be labeled "CLANIP." The test may be:

If all LAN devices have IP assigned then TRUE else FALSE

According to some embodiments, output from the test may be written to a log, displayed, or stored as:

TLANIP=IPMOCA=xx,IPETH=xx,IPWIFI=xx

The label "TLANIP" may signify the total LAN IP address assignments. The label "IPMOCA" may signify the count of addresses assigned to devices attached via a LAN MOCA interface. The label "IPETH" may signify the count of addresses assigned to devices attached via a LAN Ethernet interface. The label "IPWIFI" may signify a count of addresses assigned to a device attached via a WiFi interface. The variables may hold an integer value representing a number of devices attached to a particular interface with a valid IP address assignment.

A LAN interface test which may be performed at step 314 may be a LAN Bandwidth Statistics test which may be labeled "TLANBW." This test may ensures that at least one or more of the enabled LAN interfaces are able to send or receive network traffic based on a delta bytes count. The delta bytes count is the difference between the current value and the last recorded poll value. The poll interval may be configurable and may be set remotely by a network access device management system. A default value may be every hour. The delta bytes test condition may be labeled as "CLANBW." The test may be:

In any LAN interface, if both the delta number of bytes sent and number of bytes received are greater then LANBW_THRESHOLD return TRUE else return FALSE According to some embodiments, output from the test may be written to a log, displayed, or stored as:

TLANBW=LMOCATB=xx,LMOCARB=xx,
LETHTB=xx,LETHRB=xx,LWIFITB=xx,LWIFIRB=xx

The label "TLANBW" may signify total LAN bandwidth. The label "LMOCATB" may signify transmission bandwidth for a LAN MOCA interface. The label "LMOCARB" may signify reception bandwidth for a LAN MOCA interface. The label "LETHRB" may signify transmission bandwidth for a LAN Ethernet interface. The label "LETHRB" may signify reception bandwidth for a LAN Ethernet interface. The label "LWIFITB" may signify transmission bandwidth for a LAN WiFi interface. The label "LWIFIRB" may signify reception bandwidth for a LAN WiFi interface. The variables "xx" may hold an integer value representing a number of bytes for a particular interface.

A test performed at step 314 may include a LAN MoCA STB (Set-Top Box) Devices IP Connectivity test, which may be labeled "TLANIPCONSTB." This test may ensure that one or more STB devices that are attached and active on this LAN interface respond successfully to a PING test operation. Set-Top Box devices that failed a PING test may be logged. Set-Top Box devices may have associated hostnames such as, for example, "IP-STB1", "IP-STB2", etc. Other devices supported in the MoCA network via MoCA adapters which respond to a ping test may also be tested. A condition of the test may be labeled "CLANIPCONSTB_PNG." The test may be:

If all attached and active STBs respond to ICMP PING then return TRUE else return FALSE.

According to one or more embodiments, output from the test may be written to a log, displayed, or stored as:

TLANIPCONSTB=FCNT=sc, xx,IPLIST=yy

The label "TLANIPCONSTB" may signify the total set-top boxes that passed a LAN IP connectivity test. The variable "sc" may hold an integer value of a number of devices passed the test. The variable "xx" may hold an integer value of a number of devices failed the test. The variable "yy" may provide a list of devices that failed the ping test in the form of MAC address, IP address for each device that failed the test.

In some embodiments no LAN testing may be performed. In other embodiments, one or more LAN tests may be performed. After completions of LAN testing the method 300 may begin store one or more diagnostic test results at block 316.

Diagnostic test results stored at block 316 may be stored in one or more formats. According to some embodiments, test results may be stored both in a persistent log file on a network access device, such as a broadband home router, as well as in a TR-069 parameter extension. Test results returned from an agent, process, may be saved in the persistent log file, and in a TR-069 vendor extension parameter. The persistent log file may keep a history of self-diagnostics results while the TR-069 vendor extension parameter may keep the latest result instance.

For each test, information to be saved in the persistent log file may contain the following:

Test start date and time written as [mm:dd:yy HH:MM:SS] SCHKS UPTIME=t (where mm=month,dd=day,yy=year, HH=hour,MM=min,SS=second, t=device uptime).

Test results written as [HH:MM:SS] Output Test Log as illustrated in the output examples of the diagnostic tests of blocks 310, 312, and 314.

In addition, the following events may be recorded in the persistent log file when they occur:

Table of logged events according to an embodiment

| Event Type | Persistent Log Output |
|---|---|
| Device Reboot | [mm:dd:yy HH:MM:SS] REBOOT |
| Device Factory Reset | [mm:dd:yy HH:MM:SS] FRESET |
| A failed TR-069 Transaction | [mm:dd:yy HH:MM:SS] MethodName, ParameterValue, FaultCode |
| | The MethodName and FaultCode are defined in TR-069 Technical Report. The ParameterValue may not contain any special symbols (i.e., {,}, <,>). These special symbols may be discarded to avoid complications in XML parsing. If there is no ParameterValue, then ParameterValue may be represented using "NULL" as the string value. |
| WAN IP not assigned or if there a new WAN IP address assigned. (WAN IP may be checked periodically (e.g., every hour), which may configurable via a customer premise equipment management system to check for no WAN IP assignment. In addition, any new WAN IP assignment which is different than the last IP before may be logged.) | [mm:dd:yy HH:MM:SS] xx where xx = NOWANIP or new WAN IP address |

The results from one or more tests may also be stored as a TR-069 vendor extension parameter.

At block 318, the method 300 may determine whether one or more corrective actions may be taken. If one or more corrective actions may be taken, the method may continue at block 320. If no corrective actions may be taken, the method 300 may end at block 322.

Whether or not a corrective action may be taken may, according to some embodiments, be determined by a mapping between a condition and a corrective mappings. Exemplary conditions include the conditions specified as test conditions for blocks 310, 312, and 314. The following table illustrated default list of exemplary corrective actions. These corrective actions may be re-defined using a network access device management system. Redefinition may be based on test results returned, e.g., for each condition expression listed, the associated corrective action is invoked if the condition expression is FALSE. In addition, the list of condition expression may be implicitly joined using the logical OR operation. For example, in the exemplary corrective action table below, if there are more than one condition expressions returning a FALSE value, the corrective action performed may be chosen by identifying the correction action with the highest precedence in the group.

According to an embodiment, a definition of corrective actions priority precedence from highest to lowest may be:

Factory Reset (FRESET)

Reboot (REBOOT)

Re-Initialize Interface (RESETINT)

No Operation (NOOP)

Table of corrective mappings according to an embodiment

| Condition Expression | Corrective Action |
|---|---|
| CBHR_MEM | REBOOT |
| CBHR_CPU | REBOOT |
| CWANTYPE | REBOOT |

-continued

Table of corrective mappings according to an embodiment

| Condition Expression | Corrective Action |
|---|---|
| CWANIP | REBOOT |
| CWANIPCON_PNGDF | REBOOT |
| CWANBW | REBOOT |
| CLANBW | NOOP |
| CLANTYPE | NOOP |
| CWANMOCA_PORT | NOOP |
| CWANETH_PORT | NOOP |
| CWANMOCA_RATE | REBOOT |
| CWANIPCON_PNGDNS | REBOOT |
| CWANIPCON_DNSR | REBOOT |
| CLANMOCA_RATE | REBOOT |
| CLANIPCONSTB_PNG | REBOOT |
| CLANMOCA_PORT | RESETINT |
| CLANETH_PORT | RESETINT |
| CLANWIFI_PORT | RESETINT |
| CLANDEV | NOOP |
| CLANIP | NOOP |

Other conditions or rules may be used when applying a corrective action mapping such as the above table. For example, if the FactoryReset correction option is enabled, the factory reset operation may be applied instead of a reboot operation, if and only if, the last "X" number of consecutive self-diagnostics operations by the agent resulted in rebooting the network access device as the corrective action. The "X" number consecutive count may be configurable via a customer premise equipment management system. A default value may be three. If a corrective action is to be performed the method 300 may continue at block 320.

At block 320, after one or more diagnostics operation are completed, the method 300 may determine whether a corrective action is to be performed immediately or scheduled. Scheduled invocation may imply that a corrective procedure is invoked at a pre-established time such as defined in a TR-069 parameter configuration, for example. Immediate invocation may imply that a corrective procedure may be invoked immediately after the self-diagnostics operation has completed. Whether a corrective action is to be performed immediately or scheduled may be specified by one or more parameters, a type of corrective action to be performed, a user preference, or other factors. If a corrective action is scheduled the method 300 may continue at block 322. If a corrective action is to be performed immediately, the method 300 may continue at block 326.

At block 322, a process, agent, or module, such as module 122 may determine whether the scheduled period has arrived. If the scheduled period has arrived the method 300 may continue at block 326. If the scheduled period has not arrived the method 300 may wait at block 324. After a specified wait, the method 300 may return to block 322.

At block 326, the corrective action (if enabled via configuration) may be invoked. According to some embodiments, a corrective action may include providing a user interface as discussed in greater detail with reference to FIG. 4 below.

At block 328, the method 300 may end.

As discussed above in reference to FIG. 3, one or more TR-069 Vendor Extension Parameters may be used. Exemplary TR-069 vendor extension parameters which may be used to administer an agent, process, or module, such as module 122, are provided below. Administration of an agent, process, or module may include activation/deactivation, scheduling, and saving one or more returned results. In the embodiment below, X_VENDOR may be a generic placeholder, and may be assigned appropriately by a network access device vendor.

A table of self-diagnostic test parameters, corrective action parameters, and scheduling parameters is provided below, according to an embodiment.

| Name | Type | R/W | Description | Default |
|---|---|---|---|---|
| InternetGatewayDevice.X_VENDOR.SDERA | Object | | The top-level object for an Internet Gateway Device for the self-diagnostics and error resolution agent | — |
| Enable | Boolean | R/W | Enable or disable the agent, Default is disabled. | False |
| ScheduleOption | Boolean | R/W | True implies that the self-diagnostics is scheduled periodically and false implies immediate, i.e., performs the self-diagnostics now, followed by the correction procedure if enabled. | True |
| TestCases | String | R/W | Defines one or more test cases used in self-diagnostics. The default is ALL available test cases are used. | TBHR, TWANTYPE, TWANMOCA, TWANETH, TWANIP, TWANIPCON, TWANBW, TLANTYPE, TLANMOCA, TLANETH, TLANWIFI, TLANDEV, TLANIP, TLANBW, TLANIPCO NSTB |
| SelfDiagPeriodicInterval | Integer | R/W | In seconds (applies only if scheduled mode is true). Default is once a day. This works similarly to periodic inform. | 86400 |
| StartTime | DateTime | R/W | Local time to start self-diagnostics. Note: Applies only if scheduled mode is True, i.e. Self-diagnostics is scheduled periodically. | Default execution time is 2 AM |
| EnableCorrection | Boolean | R/W | Enable or disable the corrective action support. Default is disabled. | False |
| CorrectionStartTime | DateTime | R/W | Local time to start correction procedure. 00:00:00 implies immediate following the completion of Self-diagnostics | Default execution time is 3 AM |
| EnableCorrectionFactoryReset | Boolean | R/W | When enabled, the correction action will perform a factory reset instead of a reboot operation if and only if in the last 3 consecutive self-diagnostics | False |

| Name | Type | R/W | Description | Default |
|---|---|---|---|---|
| | | | operations which had resulted in rebooting the device as the corrective action. | |
| REBOOTCOUNT | Int | R/W | Number of reboots performed by agent before applying a factory reset operation as the corrective action; Default is after 3 consecutive reboots. | 3 |
| WANIP_POLLING_INTERVAL | Int | R/W | Time interval before next WAN IP check; default is 1 hour | 3600 |
| BANDWIDTH_POLLING_INTERVAL | Int | R/W | Time interval before next bandwidth polling test. | 3600 |
| MEM_THRESHOLD | Int | R/W | Memory utilization in percentage | Vendor defined |
| CPU_THRESHOLD | Int | R/W | CPU utilization in percentage | Vendor defined |
| MoCA_RATE_THRESHOLD | int | R/W | MoCA Tx or Rx rate (Mbps) | 180 |
| WANBW_THRESHOLD | Int | R/W | Number of bytes | 0 |
| LANBW_THRESHOLD | Int | R/W | Number of bytes | 0 |
| CorrectiveAction.{i}. | | R/W | This object defines the condition expression and associated corrective action | |
| ConExpression | String | R/W | Condition expression definition | Default values are listed in Section 5.2 |
| ActionName | String | R/W | One of the string value: FRESET, REBOOT, RESETINT, or NOOP. | Default values are listed in Section 5.2 |

Parameter values assigned using a remote network access device management system via a "set parameter value" operation may be persistent across device reboot operations. These parameter values may revert back to the default values in a factory reset operation. One or more of the test cases may be specified by default to be used by the agent during diagnostics. However, a network access device management system may add or remove one or more test case entries as desired.

A table of self-diagnostics result parameters, according to an embodiment, is provided below.

| Name | Type | R/W | Description | Default |
|---|---|---|---|---|
| InternetGatewayDevice.X_VENDOR.SDERA.Result | Object | | The top-level object for an Internet Gateway Device self-diagnostics results | — |
| SelfDiagCompleted | DateTime | R | The date and time upon completion of self-diagnostics. | |
| SelfDiagState | Integer | R | 1 if self-diagnostics test completed, 0 otherwise | |
| TestCase.{i}. | | | The test cases object | |
| Name | String | R | The name of an enabled test case, e.g., TBHR, as specified above | |
| Log | String | R | The result log returned from the corresponding test case, as specified above. | |

The parameters defined in the above table may support both active and passive notifications. With passive notification, the self-diagnostics results upon completion of one or more of the test cases may be sent during the next periodic inform (an update from a network access device to a network access device management system). With active notification, the self-diagnostics results upon completion of one or more of the test cases may be sent immediately via the TR-069 VALUE CHANGE inform method. In addition, a GET_PARAMETER_VALUE operation may be performed by a network access management system to retrieve the results.

According to some embodiments, certain errors may have specific logging, software objects, and parameters associated with them. For example, a Video-on-Demand (VOD) pixilation issue may have specific TR-069 parameter extensions defined in a module of a network access device. A potential cause may be if a MoCA link transmission or reception rate is below a recommended level. When enabled, MoCA network performance may be recorded in a BHR persistence log as well as a TR-069 parameter for troubleshooting analysis when necessary.

According to some embodiments, a set of TR-069 vendor extensions (LAN_MoCA_CurrentRate, WAN_MoCA_CurrentRate, LAN_MoCA_THRESHOLD_CROSSING, WAN_MoCA_THRESHOLD_CROSSING) may be implemented to record the MoCA network performance level whenever there is an active Video-on-Demand session. To better understand the operational behavior of the MoCA network, the THRESHOLD_CROSSING parameter may record the number of times the MoCA transmission or reception value falls below a recommended THRESHOLD level during a Video-on-Demand session.

This table below provides an example of an object and associated parameters that may be used to support TR-069 passive notification.

| Name | Type | R/W | Description | Default |
|---|---|---|---|---|
| InternetGatewayDevice.X_VENDOR.VoDMonitor | Object | | The top-level object for an Internet Gateway Device for monitoring the VoD traffic and MoCA Tx and Rx levels. | — |
| Enable | Boolean | R/W | Enable or disable VoD monitoring | |
| LAN_MoCA_CurrentRate | String | R | Current MoCA Tx, Rx rate Format: Tx = xx, Rx = xx | |
| WAN_MoCA_CurrentRate | String | R | Current WAN MoCA Tx, Rx rates Format: Tx = xx, Rx = xx | |
| LAN_MoCA_THRESHOLD_CROSSING | String | R | Number of times the THRESHOLD has been crossed. Format: TxCount = xx, RxCount = xx | |
| WAN_MoCA_THRESHOLD_CROSSING | String | R | Number of times the THRESHOLD has been crossed for MoCA Tx and Rx Format: TxCount = xx, RxCount = xx | |

The MoCA network performance level during an active VOD session may be recorded (at a maximum rate of 2 entries per hour) in the BHR log which may use the following format:

| Event Type | Persistent Log Output |
|---|---|
| VoD Session Monitoring | [mm:dd:yy HH:MM:SS] VODM WAN_MoCA_CurrentRate, WAN_MoCA_THRESHOLD_CROSSING, LAN_MoCA_CurrentRate, LAN_MoCA_THRESHOLD_CROSSING |

According to some embodiments, an agent, module, or process for diagnostics and corrective actions may be initiated using one or more methods such as, for example, by internal periodic scheduling, or by a support personnel using a network access device management system. In addition, a corrective action may be performed by the network access device immediately, or at a scheduled time depending on the results returned from the self-diagnostics operation. The immediate mode may be initiated via a network access device management system using a "set parameter value" operation, and the assignment of the parameter values Scheduled to False. In this mode, the agent may be invoked immediately following the completion of the network access device management system operation. Internal periodic scheduling may imply that the self-diagnostics operation may occur repeatedly at a scheduled time (e.g., once a day at 2 A.M.).

The agent, process, or module may be configurable through one or more methods such as, for example, via a network access device management system or through a configuration file, unless additional new test cases are needed. This may allow the flexibility to fine-tune the agent's operational behavior while deployed in the field without having to upgrade the network access device firmware.

The self-diagnostic agent may run independently of whether a network access device can communicate with a network access device management system. If a diagnostics agent, module, or process cannot retrieve time from a NTP (Network Time Protocol) server, the agent may perform a self-diagnostics test after 5 minutes even if it's using the scheduled mode option. The self-diagnostics agent may run independently of whether the network access device can access the NTP server. During the self-diagnostics operation, the network traffic flow may not be interrupted. During the execution of the self-diagnostics operation, a vendor defined fault-code (e.g., 9801) with the description "Unable to process request due to self-diagnostics test in progress." may be returned for any new incoming TR-069 transaction request. The self-diagnostics operation may take less than 30 seconds from start to completion.

The persistent log file may be capable of recording a specified number of consecutive self-diagnostics results (e.g., 24). Since the persistent log file may have a static file size, the logged entries may be removed using the FIFO (first-in-first-out) principle.

Figure 4:
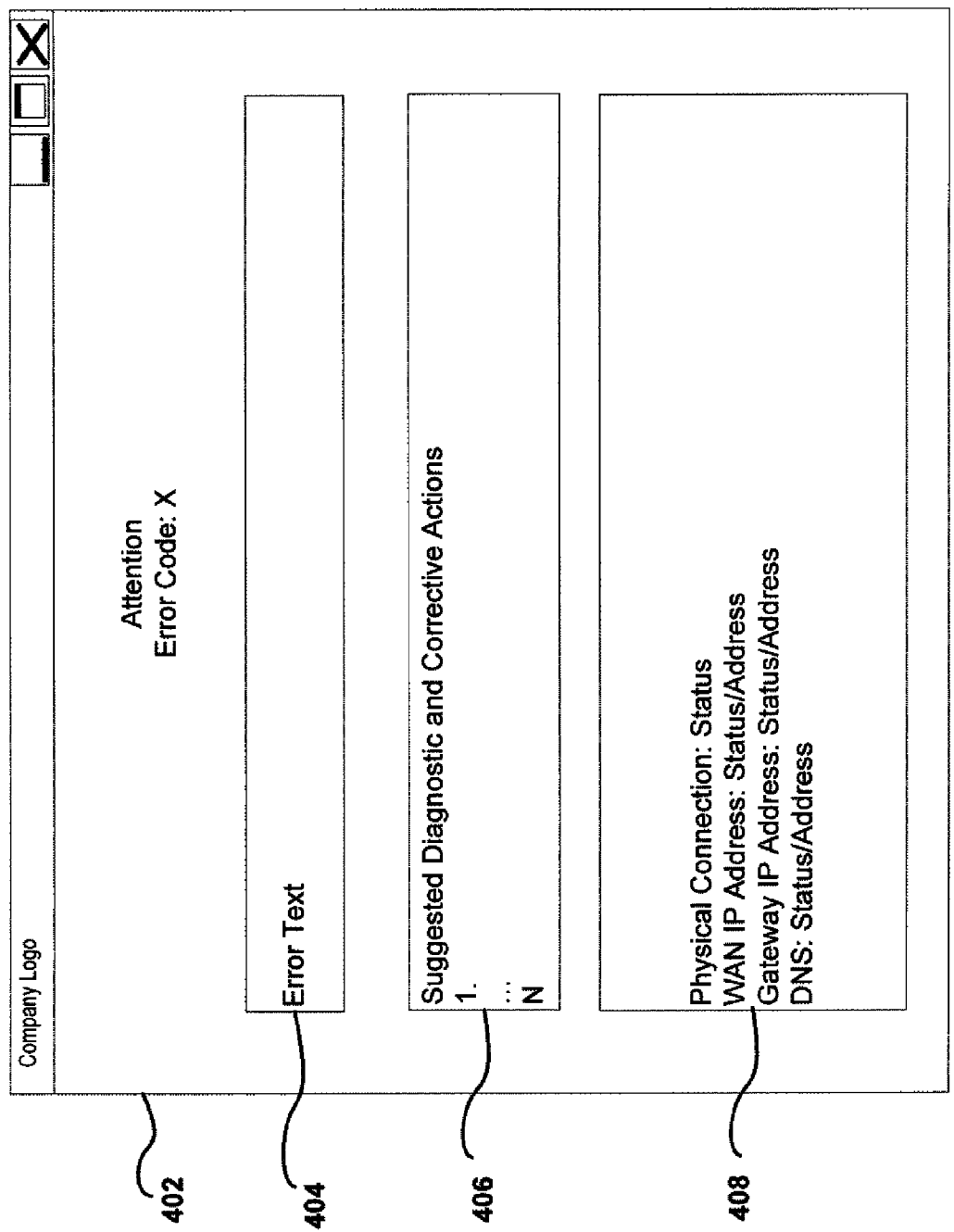
FIG. 4 illustrates an exemplary screen diagram of a system for performing residential gateway diagnostics and corrective actions, according to an embodiment of the disclosure.

FIG. 4 illustrates an exemplary screen diagram of a system for performing residential gateway diagnostics and corrective actions according to an embodiment of the disclosure. One or more error conditions may be supported by a user interface. The user interface may provide a user of a network access device such as network element 114 with help information. Help information may include troubleshooting and error resolution information. Error conditions for which a user interface may include common errors such as, for example, when a WAN IP is unavailable. If applicable, based on the error condition, a user may be presented with help information (which may reside on the network access device) that may guide a user through a troubleshooting and error resolution process.

As illustrated, in FIG. 4, user interface 402 may contain multiple elements such as error text 404, suggested diagnostic and corrective actions 406 and network access device status 408. Error text 404 may contain a description of an error associated with a displayed error code. According to some embodiments, suggested corrective and diagnostic actions may contain a link, button, or other user interface control enabling a user to trigger a diagnostic test or a corrective action. For example, a link may be provided enabling a user to reboot a network access device. Support contact information such as a phone number, an email address, or a web address may be provided.

Figure 5:
FIG. 5 illustrates an exemplary screen diagram of a system for performing residential gateway diagnostics and corrective actions, according to an embodiment of the disclosure.

FIG. 5 illustrates an exemplary screen diagram of a system for performing residential gateway diagnostics and corrective actions, according to an embodiment of the disclosure. As illustrated in FIG. 5, another issue which may be addressed by an agent or module on a network access device may be a WAN connectivity issue. For example, a network access device may be unable to pass traffic through a WAN connection (Ethernet or MoCA) and to the Internet. The problem may be due a faulty ONT (Optical Network Terminal) or due to other WAN networking issues, even though the network access device may be operating correctly with a LAN devices.

To assist a user, a module of a network access device may attempt to self-diagnose the issue and present an appropriate help support Web page to assist the customer in the troubleshooting steps, i.e., a Web page with the associated "Error Code XX" (if applicable) will be displayed to the customer. In addition, the Web page may also display a support number if the issue is not resolved by the user and the agent or diagnostic module of the network access device. In the event a user calls the support center, the error code may be provided.

Web pages with corresponding error codes may be displayed to the user if the network access device does not receive a response from the ONT (Optical Network Terminal), Gateway (e.g., Juniper ERX) or Domain Name Server (DNS) server. The error codes may be useful to the support agent in the event if the customer calls the support center.

For example, an error code display may be "Error Code 1 (ONT Down)." This error code may indicate that a network access device, such as a residential gateway has lost physical connection with the ONT. This web page may appear when the user attempts to access a website while there is no physical WAN connection such as, for example, a WAN Coax or WAN Ethernet connection.

Figure 6:
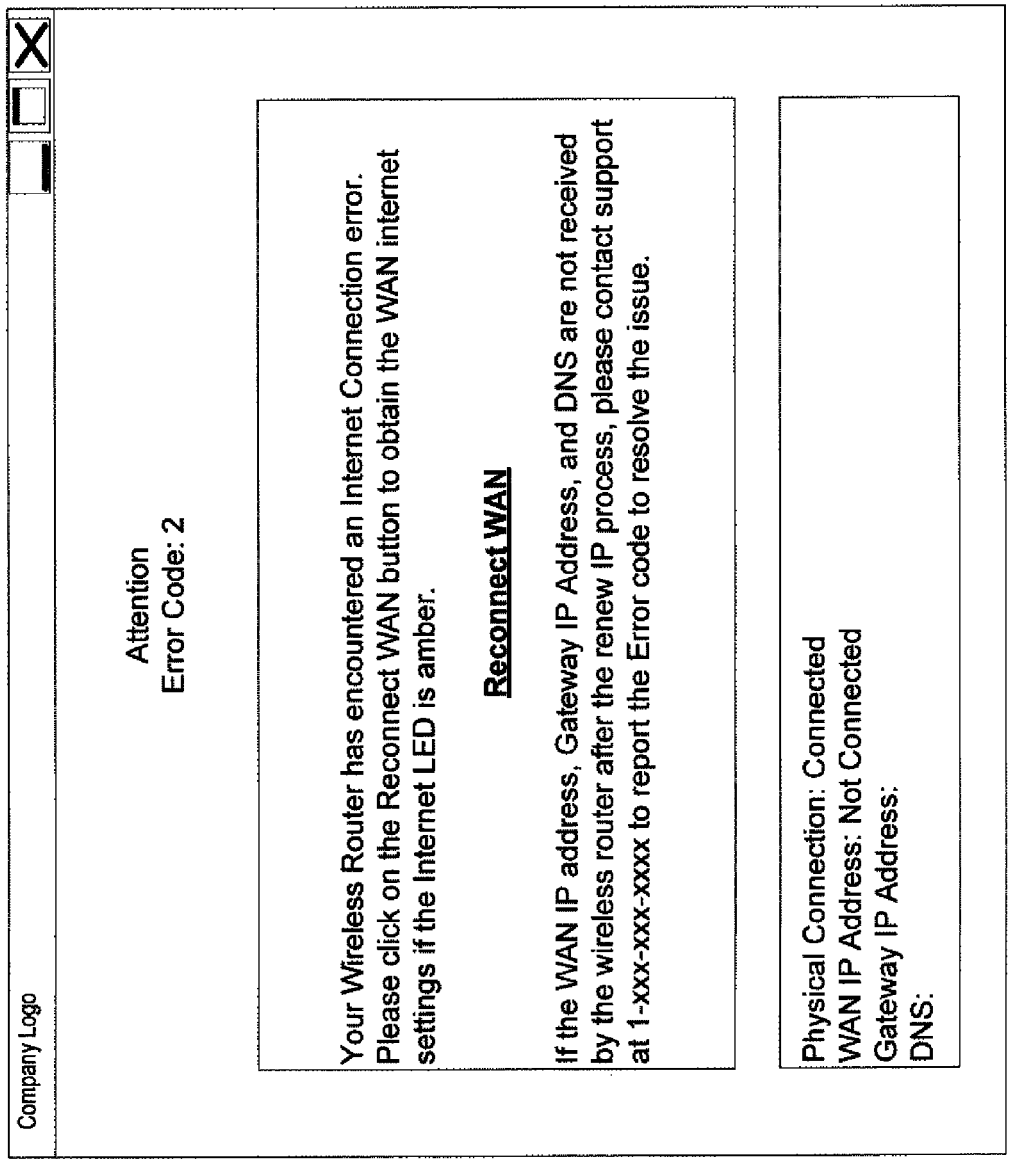
FIG. 6 illustrates an exemplary screen diagram of a system for performing residential gateway diagnostics and corrective actions, according to an embodiment of the disclosure.

FIG. 6 illustrates an exemplary screen diagram of a system for performing residential gateway diagnostics and corrective actions, according to an embodiment of the disclosure. FIG. 6 illustrates an error code which may be received if a network access device is unable to obtain a WAN IP address. An error message such as "Error Code 2 (WAN IP Address Unavailable)" may be displayed. This error code may indicate that the network access device is not able to obtain a WAN IP Address from a WAN side DHCP (Dynamic Host Configuration Protocol) server. When a LAN client attempts to send a DNS request without the network access device having a WAN IP Address, the Web page of FIG. 6 may be displayed to the user.

Figure 7:
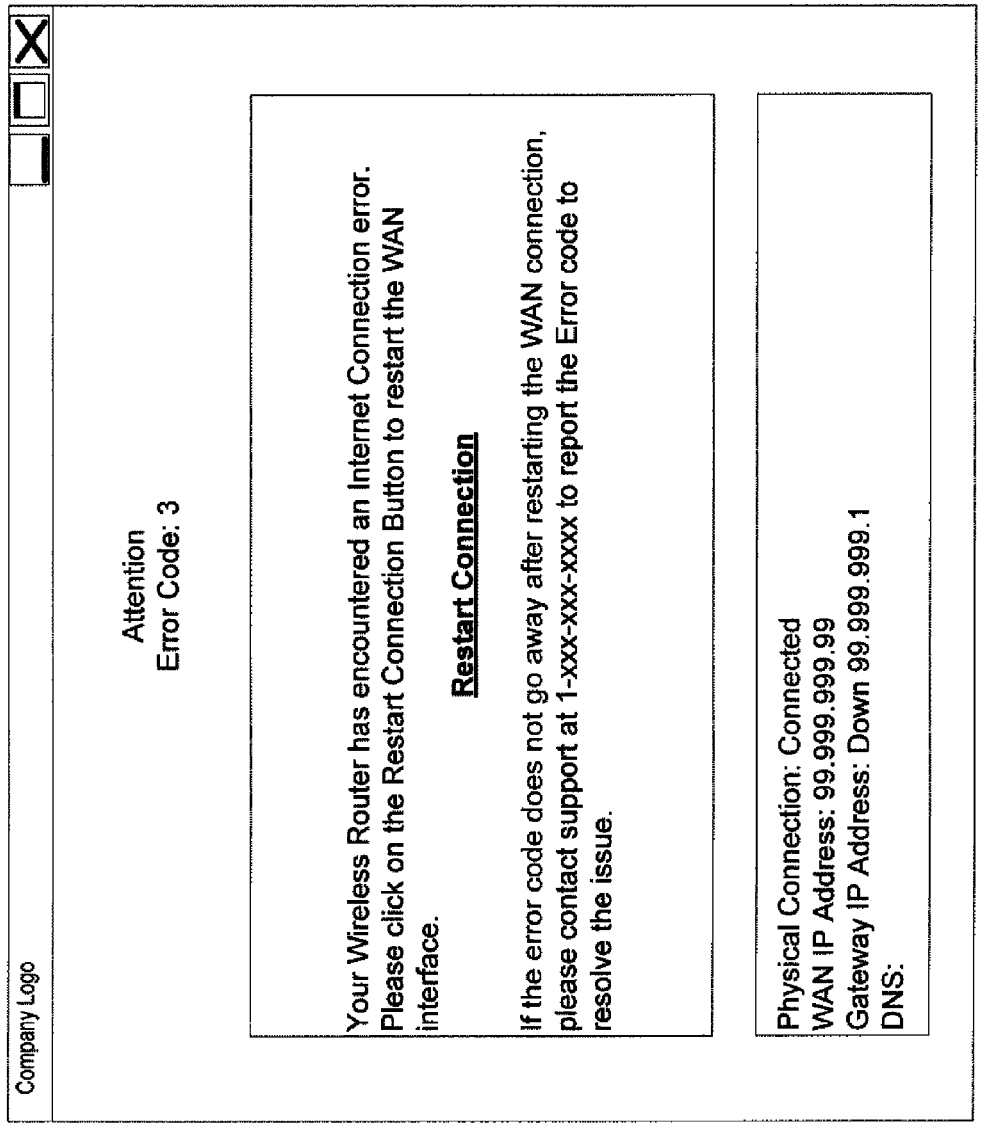
FIG. 7 illustrates an exemplary screen diagram of a system for performing residential gateway diagnostics and corrective actions, according to an embodiment of the disclosure.

FIG. 7 illustrates an exemplary screen diagram of a system for performing residential gateway diagnostics and corrective actions, according to an embodiment of the disclosure. FIG. 7 illustrates a user interface displaying an error code which may be displayed if a network gateway is down (e.g., "Error Code 3 (Gateway Down)"). This error code may indicate that a network access device has connectivity to the ONT (Optical Network Terminal) but not to a Gateway (e.g., Juniper ERX). When a DNS request is not responded to after going through a DNS retry, the network access device may ping the Gateway address of the Gateway. If the ping test fails upon a specified number of attempts (e.g. 4 tries), the Web page illustrated in FIG. 7 may be displayed to the user.

Figure 8:
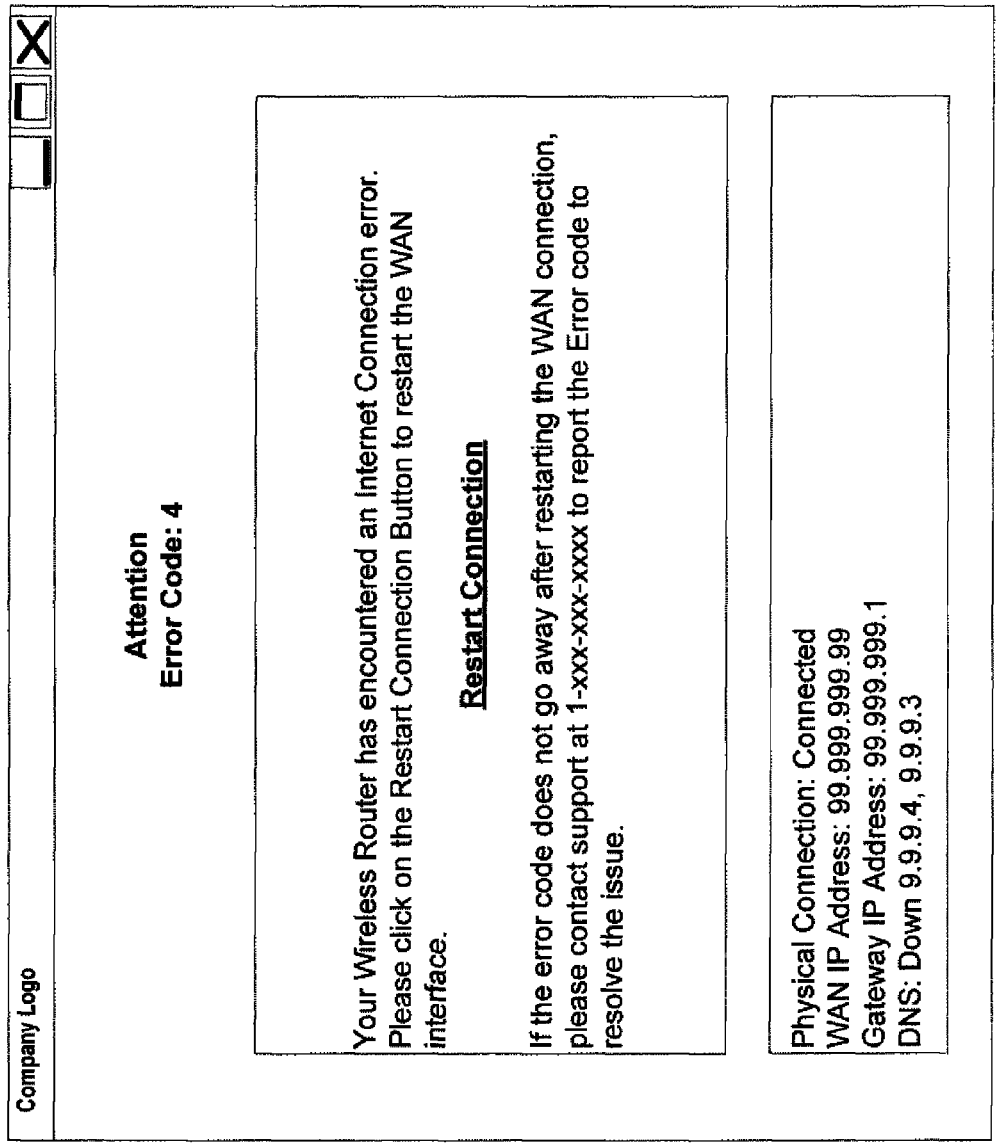
FIG. 8 illustrates an exemplary screen diagram of a system for performing residential gateway diagnostics and corrective actions, according to an embodiment of the disclosure.

FIG. 8 illustrates an exemplary screen diagram of a system for performing residential gateway diagnostics and corrective actions, according to an embodiment of the disclosure. FIG. 8 illustrates an error code which may be received if a network access device is unable to receive a response from a DNS. An error message such as "Error Code 4 (DNS Down)" may be displayed. This error code may indicate that a network access device has connectivity to the ONT and Gateway, but is not receiving any responses from the DNS servers. If the network access device does not receive any DNS responses after going through the DNS retry, the network access device may first ping the Gateway, then the DNS servers. If an error occurs, the Web page depicted in FIG. 8 may be displayed to a user.

Figure 9:
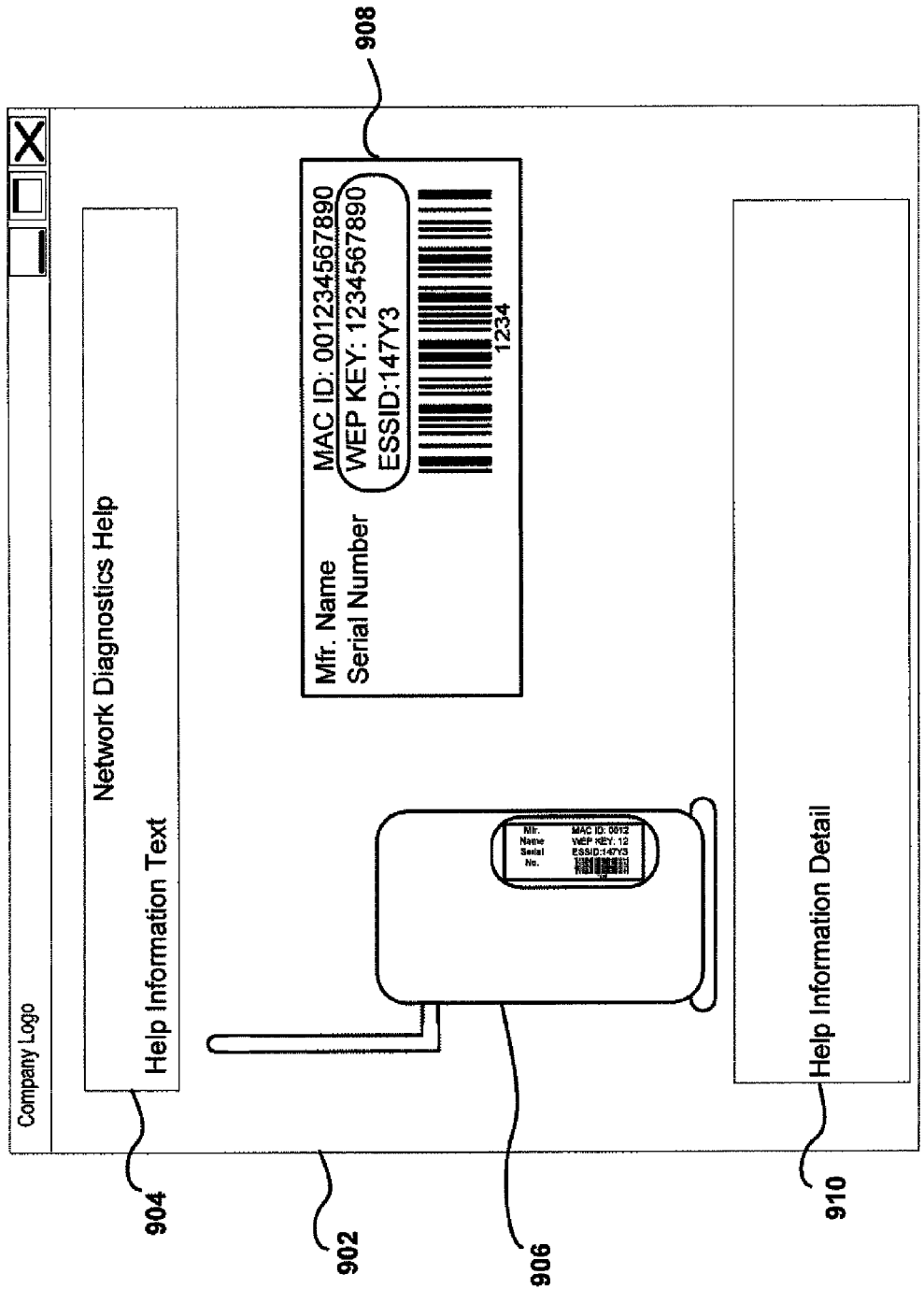
FIG. 9 illustrates an exemplary screen diagram of a system for performing residential gateway diagnostics and corrective actions, according to an embodiment of the disclosure.

FIG. 9 illustrates an exemplary screen diagram of a system for performing residential gateway diagnostics and corrective actions, according to an embodiment of the disclosure. As depicted in FIG. 9, a user interface may be provided to handle wireless networking configuration for a wireless network device. A wireless network device, such as, a broadband home router or a residential gateway may be provided to a user configured with security enabled. Many users may not know how to find a default security code, such as by way of a non-limiting example, a WEP key. The security code may be located on a labels on the network access device.

According to one embodiment, a network access device may have dual SSIDs (Service Set Identifiers): a public SSID (to provide wireless help), and a primary SSID which is secured (e.g., using WEP encryption on the network access device). For security reasons, devices connected wirelessly via the wireless help SSID may be able only to access local web pages hosted by the network access device for wireless help such as, for example, the interface displayed in FIG. 9 below detailing where to find the primary SSID name and WEP key. As illustrated, section 904 may contain a help message such as: "Important: You are connected to the wireless help network and not have full Internet or Router access. Please follow the information below to connect to the main wireless network for full access." Element 906 may provide a picture of a network access device with one or more circles, highlights, or other indicators showing important features such as the location of a tag containing network access information. Element 908 of FIG. 9 may contain an enlarged image of a portion of a wireless network access device showing the detail of that portion (e.g., illustrating the location of a WEP KEY and SSID on a tag). Element 910 may contain help information associated with elements 906 and 908, which may explain how to locate default security information and how to reset a network access device to use default security information.

The wireless help option using a public SSID can be disabled or enabled. According to some embodiments, wireless help may be disabled or enabled remotely via a TR-069 vendor extension. By default it may be off. An example of a wireless public help parameter is provided below:

| Name | Type | R/W | Description | Default |
|---|---|---|---|---|
| InternetGatewayDevice. WANDevice.X_Vendor_ WifiHelpAccessEnable | Boolean | R/W | Enable or disable public WiFi SSID | False |

According to some embodiments a parameter such as, for example, a TR-069 vendor extension parameter, may be implemented to track the number of times a web page provided by a network access device has been accessed in order to gauge the success of the implementation. This may be retrieved from a remote network access device management system for support analysis.

| Name | Type | R/W | Description | Default |
|---|---|---|---|---|
| InternetGatewayDevice. WANDevice.X_Vendor_ WebPageAccess Legend: xx = # of times each Web page had been displayed to the customer | String | R | Number of times each error Web page has been accessed by the customer. Format: Error1 = xx, Error2 = xx, Error3 = xx, Error4 = xx, WiFiHelp = xx | |

User troubleshooting web pages may be performed using the HTTP redirect function without having a computer or network access device be rebooted to clear the cached DNS on the computer side. This may be done via the HTTP 302 temporary redirect implementation.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
    running one or more diagnostic tests on a residential gateway using a module stored on the residential gateway independent of a status of network connectivity of the residential gateway;
    storing a diagnostic test result;
    analyzing the stored diagnostic test result independent of the status of network connectivity of the residential gateway, wherein analyzing includes mapping between a condition and one or more corrective actions;
    determining a number of reboots of the residential gateway prior to resetting one or more parameters of the residential gateway, wherein the one or more corrective actions comprise resetting one or more parameters of the residential gateway to a default setting if a predefined number of consecutive self-diagnostics operations by the module resulted in rebooting the residential gateway as the corrective action; and
    performing, by the module, the one or more corrective actions in response to the analysis and independent of the status of network connectivity of the residential gateway.

2. The method of claim 1, wherein the diagnostic test comprises internal system resource tests including a memory utilization test, a CPU utilization test, and a software version test.

3. The method of claim 1, wherein the diagnostic test comprises LAN diagnostic tests including: a test to verify that a LAN interface is enabled and active, a test to verify that bandwidth for a Multimedia over Coax Alliance (MoCA) based interface meets a specified threshold, a test to verify that errors of a LAN Ethernet port are below a specified threshold, a test to verify that a WiFi signal level meets a specified threshold, a test to determine a number of connected and active LAN devices, a test to determine whether a connected LAN device has an IP address assigned, a test to determine the bandwidth of a LAN interface, and a test to verify IP connectivity of a Multimedia over Coax Alliance (MoCA) based set-top box device.

4. The method of claim 1, wherein the diagnostic test comprises WAN diagnostic tests including: a test to ensure that a connected residential gateway has a single WAN interface active; a test to verify that a WAN interface transmission rate meets a specified threshold, a test to verify that errors of a WAN Ethernet port are below a specified threshold, A WAN IP assignment test, a WAN IP connectivity test, and A WAN interface bandwidth test.

5. The method of claim 1, wherein the diagnostic test result is stored as at least one of: a log file and a Technical Report 069 (TR-069) compliant parameter extension.

6. The method of claim 1, further comprising transmitting the stored diagnostic test result to a remote equipment management system.

7. The method of claim 1, wherein the one or more corrective actions comprise resetting a network interface of the residential gateway.

8. The method of claim 1, wherein the one or more corrective actions comprise rebooting the residential gateway in response to at least one of the following conditions occurs: a memory threshold test, a CPU utilization test, a WAN interface enablement test, a WAN IP assignment test, a test to check the responsiveness of a first hop network router in a WAN, a WAN bandwidth test, a WAN MoCA port status test, a test to check the responsiveness of a DNS in a WAN, a DNS resolution test, a LAN MoCA data rate test, and a test to check the responsiveness of at least one device supported in the LAN.

9. The method of claim 1, wherein the one or more corrective actions comprise providing a user interface to a user of the residential gateway.

10. The method of claim 9, wherein the user interface comprises an interface provided by the residential gateway using public wireless networking to provide help with a network connectivity issue.

11. The method of claim 1, wherein the one or more diagnostic tests are run in response to a request received from an equipment management system.

12. The method of claim 1, wherein the one or more diagnostic tests are run in response to a scheduled request.

13. The method of claim 1, wherein the one or more diagnostic tests are run in response to a measured parameter of a component of a network element exceeding a stored threshold value, wherein the threshold value is configurable by a user of the residential gateway.

14. The method of claim 1, wherein analyzing includes mapping between a condition and a plurality of corrective actions.

15. The method of claim 14, wherein the plurality of corrective actions are prioritized.

16. The method of claim 10, wherein the interface is disabled automatically after a successful resolution.

17. A non-transitory computer readable media comprising code to perform the acts of the method of claim 1.

18. A system, comprising:
a residential gateway, wherein the residential gateway comprises one or more processors configured to:
run one or more diagnostic tests using a module stored on the residential gateway on the residential gateway independent of a status of network connectivity of the residential gateway;
store a diagnostic test result;
analyze the diagnostic test result independent of the status of network connectivity of the residential gateway, wherein the analysis includes at least a mapping between a condition and one or more corrective actions;
determine a number of reboots of the residential gateway prior to resetting one or more parameters of the residential gateway, wherein the one or more corrective actions comprise resetting one or more parameters of the residential gateway to a default setting if a predefined number of consecutive self-diagnostics operations by the module resulted in rebooting the residential gateway as the corrective action; and
perform, using the module, the one or more corrective actions in response to the analysis and independent of the status of network connectivity of the residential gateway.

19. A system, comprising:
a broadband router;
a diagnostics module stored on the broadband router, wherein the diagnostics module is configured to:
run one or more diagnostic tests on the broadband router independent of a status of network connectivity of the residential gateway;
store a diagnostic test result;
analyze the diagnostic test result independent of the status of network connectivity of the broadband router, wherein the analysis includes at least a mapping between a condition and one or more corrective actions;
determine a number of reboots of the broadband router prior to resetting one or more parameters of the broadband router, wherein the one or more corrective actions comprise resetting one or more parameters of the broadband router to a default setting if a predefined number of consecutive self-diagnostics operations by the module resulted in rebooting the broadband router as the corrective action; and
perform the one or more corrective actions in response to the analysis and independent of the status of network connectivity of the broadband router.

* * * * *